United States Patent [19]

Tsau

[11] Patent Number: 5,582,351
[45] Date of Patent: Dec. 10, 1996

[54] CONVENIENT TO USE ASPARTAME AND METHOD OF MAKING

[76] Inventor: Josef Tsau, 15358 W. Fair La., Libertyville, Ill. 60048

[21] Appl. No.: 319,585

[22] Filed: Oct. 7, 1994

Related U.S. Application Data

[63] Continuation-in-part of Ser. No. 103,704, Aug. 9, 1993, Pat. No. 5,388,771.

[51] Int. Cl.⁶ .......................... B02C 23/36; B02C 23/18; A61K 9/14
[52] U.S. Cl. ................... 241/17; 241/21; 241/27; 241/65; 366/147; 424/489; 426/453
[58] Field of Search .................. 241/15, 16, 17, 241/21, 22, 23, 27, 30, 65; 366/4, 7, 147, 148; 424/489; 426/5, 103, 453, 548; 514/58

[56] References Cited

U.S. PATENT DOCUMENTS

| | | |
|---|---|---|
| 2,595,631 | 5/1952 | Birtsch . |
| 3,712,593 | 1/1973 | Szatmari . |
| 3,965,267 | 6/1976 | Davis . |
| 4,394,498 | 7/1983 | Kastelic . |
| 4,741,910 | 5/1988 | Karwowski et al. ............... 426/548 X |
| 5,019,563 | 5/1991 | Hunter et al. .............................. 514/58 |
| 5,085,876 | 2/1992 | Tsau . |
| 5,100,239 | 3/1992 | Ono et al. . |
| 5,104,232 | 4/1992 | Lennox, III . |
| 5,324,751 | 6/1994 | DuRoss ............................ 424/489 X |

FOREIGN PATENT DOCUMENTS

| | | |
|---|---|---|
| 345965 | 4/1981 | Japan . |
| 5614344 | 8/1972 | U.S.S.R. . |

*Primary Examiner*—Timothy V. Eley
*Attorney, Agent, or Firm*—Welsh & Katz, Ltd.

[57] ABSTRACT

A high aspartame content product having round particles which are about twice as dense as aspartame powder but are surprisingly fast dissolving. The aspartame product is made by intense mechanical mixing a powder mix of aspartame and a binder with an critical amount of water and mixing time.

9 Claims, No Drawings

CONVENIENT TO USE ASPARTAME AND METHOD OF MAKING

This application is a continuation-in-part of patent application Ser. No. 08/103,704 filed on Aug. 9, 1993, now U.S. Pat. No. 5,388,771.

BACKGROUND OF THE INVENTION

1. Field Of The Invention

The invention relates to a high aspartame content powder and/or granular aspartame sweetener with convenient to use physical properties and low cost features.

2. Description Of Related Art

Aspartame powder is dusty, unflowable, static, and is difficult to wet and disperse in water. It typically takes 5 minutes or longer to dissolve aspartame in room temperature water. Since aspartame is only slightly soluble in water ($\neq 1\%$ solubility in room temperature water), its dissolution rate decreases sharply with increasing particle size. Pure aspartame granule made by roll compaction methods are very slow to dissolve in water. Even with fine granular particles, e.g., 80–140 mesh size aspartame particles typically take more than 5 minutes to dissolve in room temperature water.

A major application of aspartame is for use as a table-top sweetener. The most popular aspartame table-top sweeteners are packet, tablet, and spoon-for-spoon bulk table-top sweeteners. Aspartame tablets are slow to dissolve and are not convenient for use in cold drinks. Besides, it can not be conveniently portioned. The spoon-for-spoon bulk sweetener is made by a very expensive process which spray-dries dilute, $\neq 3\%$, hot aspartame water solution containing bulking agents such as maltodextrin. Such a product is very light, bulky, and hygroscopic, and are very expensive to package, ship, and store. The most popular table-top aspartame product is in packet form. This packet product typically has one gram of aspartame and bulking agent and has a sweetening power equivalent to 1 or 2 teaspoons of sugar. The packet contains 1.5–4% aspartame and 96–98.5% bulking agent, such as dextrose and maltodextrin. Even though the caloric content for the amount of aspartame used in a packet product is neglegibly small, an aspartame packet contains 4 calories mainly from its bulking agent. Besides increasing both cost and caloric content, a high bulking agent content product is hygroscopic which shortens the shelf life of aspartame in the product. There is, therefore, a need to improve aspartame table-top sweetener products.

Aspartame can not be used directly as a table-top sweetener like granular sugar, since the above mentioned poor physical properties make it too difficult to measure, to handle and to dissolve a small amount of aspartame needed to sweeten a glass of beverage. A variety of granulation methods have been proposed to overcome the above discussed problems of powder aspartame. These methods teach that aspartame must be granulated with a high percentage of bulking agents, e.g. over 50% composition, to obtain a fast-dissolving granular aspartame product. Since soluble bulking agents such as dextrose and maltodextrins are hygroscopic, the high bulking agent content granular aspartame products are also hygroscopic and are not ideal for use as table-top sweeteners.

Due to its high sweetening potency, many applications need to use fine particulate aspartame instead of granular aspartame. It is difficult to make powder and fine granular aspartames which have good flow, low dust, and fast dissolving properties. U.S. Pat. No 5,085,876 to Tsau teaches the use of a small amount of Caramel color to greatly enhance the dissolution rate of powder and granular aspartame. This patent, however, does not address aspartame's dust and flow problems.

Commercial aspartame packet products, such as the product Equal, mix a small amount of aspartame, $\neq 1.8\%$–$4\%$, with a large amounts, $\neq 96\%$–$98\%$, of fast-dissolving fast-flowing granular bulking agent, such as granular dextrose or granular maltodextrin to obtain a fast-dissolving and free-flowing table-top packet aspartame sweetener. This proves that, in water, dispersed fine aspartame powder particles are actually fast dissolving. Such a high bulking agent content product, however, is both expensive and hygroscopic and has significant amount of caloric content, 4 cal/packet. Further, part of the aspartame, from $\neq 3\%$ to $\neq 25\%$ of the total aspartame content, in this type of product clings on the inner wall of the packet becoming unavailable for sweetening uses.

Besides low dust, low hygroscopicity, and being fast-dissolving, an ideal table-top granular aspartame sweetener should have dust-free hard particles. It should also have excellent flow characteristics for both high-speed packaging to make low cost packet products and for easy pouring from containers such as a shaker or packet for table-top sweetening applications. In addition, it should be ideal for an aspartame table-top sweetener product to have less than 0.5 calorie per serving so that a zero calorie claim can be made.

Some of these ideal properties do not co-exist easily. For example, the larger the granular particles the less dusty the product is. Increasing the granular particle size, however, usually greatly reduces a particle's dissolution rate. It is also generally true that increasing a particle's hardness reduces dust but also retards dissolution rate. Spherically shaped granular particles have an optimum flow character but the lowest dissolution rate due to the fact that they also have the smallest surface area. It should be surprising that an aspartame sweetener can be made to have all the above mentioned ideal properties.

Spherical fat-encapsulated granular aspartame can be made by spray-congealing hot-melt fat dispersed with aspartame. It is a water-insoluble product useful in baked goods to stabilize aspartame during baking. Spherical granular aspartame can also be made in a centrifugal force granulator such as the CF granulator made by Vector Co. and an extrusion-spheronization method. None of these methods are known to make spherical granular aspartame with a fast dissolution rate.

SUMMARY OF THE INVENTION

The invention relates to a low dust, free-flowing high-aspartame-content products having round powder and/or granular particles. It is about twice as dense as powder aspartame but is surprisingly fast-dissolving. It is further surprising that its larger granular particles are almost equally fast dissolving as the smaller granular and powder particles of aspartame. The invention also relates to a method to make the product. The inventive method mixes powder aspartame with an edible water-soluble powder binder, a specific amount of water or ice in an intense mechanical mixer to form round particles, mostly smaller than 30 mesh size. The wet product formed is then dried.

DETAILED DESCRIPTION OF THE INVENTION

The subject invention relates to a free-flowing, low dust, low hygroscopic, readily wettable, easily dispersible, and fast dissolving aspartame sweetener product which is essentially calorie free, having less than 0.5 calorie per serving, yet equivalent to two teaspoons of sugar. Such a product has round particles hard enough to be shipped, packaged, and handled without having significant particle breakage. The product is about twice as dense as commercial powder aspartame having a narrow bulk density range from about 0.40 g/cc to about 0.60 g/cc. (The bulk density used and discussed herein is untapped bulk density.) The product has an homogeneous composition containing on a dry weight basis about 60–97% aspartame and 3–40% binder, and, if water is accounted for, may also contain about 0.5–5% by weight water. The binder is an edible water-soluble powder material such as maltodextrin, dextrin, corn syrup solid, gum arabic, polydextrose, alcohol sugar, soluble starch, and povidone. The inventive product can have granular, fine granular, and/or powder particles depending on intended applications. For example, fine granular and powder particles in the particle size range of about 60–200 mesh is particularly suitable for use in powder drink products. Somewhat large particle size range, e.g., 40–120 mesh is preferred for use in table-top sweetener applications to emphasize its low dust and free-flowing features. A tabletop shaker sweetener for beverage applications can have even larger particle size range, e.g., 20–60 mesh.

The broad application potential of the inventive product relies partially on that the inventive product is surprisingly fast dissolving. It should be expected that a high-aspartame-content granular product having dense round particles is very slow dissolving, since aspartame has a low solubility and the dry powder products of aspartame are also slow dissolving. It is, therefore, surprising to find that the products of the subject invention are fast dissolving. Their dissolution rates are actually comparable to the Caramel containing aspartame powder and granules described in the above cited patent. The fine granular and powder portion, $\neq$60–200 mesh, of the inventive product dissolves in room temperature water under gentle stirring in about 30 seconds. It is further surprising that the large granular particle portion of the inventive product is also fast dissolving. In other words, unlike most granular products, the dissolution rate of the inventive product does not sharply decrease with increasing particle size. For example, the 20–60 mesh size portion of the inventive products dissolves in about 30–60 seconds in room temperature water under gentle stirring.

Aspartame powder is known to be slow dissolving. The bulk density of aspartame powder is in the range of 0.2–0.3 g/cc. Aspartame granulated in a fluid-bed granulator containing about 0–40% binder, having bulk density around 0.3–0.4 g/cc are also slow dissolving. Aspartame granules made by roll compaction with or without up to 10% binder having a bulk density in the range of 0.6–0.8 g/cc are also slow dissolving. It is surprising that the inventive powder and granular aspartames, having a narrow bulk density range, $\neq$0.40–0.60 g/cc, and preferably 0.45 g/cc–0.55 g/cc, in the middle of different slow dissolving aspartame powder and granular forms, are fast dissolving. The round and moderately dense particles of the inventive product have greatly improved flowability, water wettability and dispersibility over powder aspartame which has fine needle particles. Besides, the round aspartame particles of this invention appear to have an unique structure which can be quickly penetrated and desintegrated by water. This is likely due to how the inventive product is made. During the process of preparing the aspartame of the subject invention, the binder quickly dissolves in water to form a thin coating on the surface of the fine aspartame powder particles and to bind them to form round particles. This thin binder coating should significantly improve the fine aspartame powder particles' wettability and dispersibility. The particle of the inventive product may also have an unique texture or porosity which allows rapid water penetration to desintegrate the whole particle. Not intending to limit the invention to any single theory, it is possible for the particles of the inventive product to have the right texture and/or porosity to allow water's capillary action to play an important role here to enhance their dissolution rate but this capillary effect may not be operative in other powder and granular aspartames described above. As expected, having dense and round particles the inventive aspartame products have excellent flow character. Even their very fine particle portions, such as the portion having particle sizes smaller than 100 mesh, still have free-flowing property. Therefore, even a fine powder aspartame product of this invention can be conveniently handled and used directly.

The inventive product is significantly more convenient to use than aspartame alone. Its free flowing property allows aspartame to be handled with greatly reduced labor, time, dust and aspartame loss. It also enables aspartame to be conveniently measured, such as spooned and poured, alone without the need of greatly diluting it with bulking agent. It also solves the difficult to mixing and the lumping physical properties of powder aspartame. In water the inventive product is instantly wetted and disperse and is fast dissolving. It saves time and labor to dissolve or use the inventive product instead of using pure aspartame powder and granule. Since it is twice as dense as powder aspartame, it can be shipped twice as much in each truckload resulting in saving shipping cost and storage space.

The invention also relates to a method to make a dense fast-dissolving high-aspartame-content product containing an edible water-soluble binder having round powder and/or granular particles in the size range of $\neq$20–200 mesh. The method uses an intense mechanical mixer having an mixing power capable of converting, in the presence of a binder and a critical amount of water, fine needle or rod crystalline aspartame powder particles into round powder and granular particles. The intense mechanical mixing quickly converts powder aspartame into fast-dissolving round particles and then, as quickly, to slow-dissolving round particles. The inventive method first mixes powder aspartame with powder binder and then mixes the powder mixture with water or crushed ice in an intense (high rpm) mechanical mixer and stop mixing as soon as the fast-dissolving round particles are formed. This is at a stage where most particles are still smaller than $\neq$30 mesh. This process is useful for batch processing where it is necessary or desirable to use only one mixer.

Alternatively, a binder can be first dissolved in water to obtain binder solution, which is added to aspartame powder, as liquid or frozen particles, under intense mixing to obtain round particles generally smaller than 30 mesh. This alternative process is preferred in a continuous process and when the binder is not in powder form.

The intense mechanical mixer can be a mix pelletizer such as a R-type intense mixer made by Eirich Machines Ltd, the choppers in a plow mixer such as the Mixmill mixer made by Processall and a continuous intense mixing granulator such as a Turbulizer made by Bepex Company. These intense mechanical mixers typically mix at a speed between about 1000 to about 4000 rpm. In a batch process water is added slowly to a powder mixture of aspartame and binder under intense mechanical mixing. When the water content has reached a narrow critical range ($\neq$15–30% by weight), the wetted powder mixture quickly turns into round powder and granular particles which continue to grow in size with continued intense mechanical mixing with or without adding more water. Upon obtaining round particles in the size range mostly smaller than 30 mesh, the intense mixing stops right away and the wet particles are discharged into a dryer to be dried. In a continuous intense mixing process a powder mixture of aspartame and binder and water are continuously added through separate inlets to a continuous intense mixing granulator, such as the Turbulizer made by Bepex, at a feeding rate ratio within the above described narrow critical water content range for the formation of the round particular powder and/or granular product of this invention. A continuous dryer, such as a vibratory fluid-bed dryer made by Carrier Company, can be used to collect and to dry the wet product obtained. The processing time, after adding water, is typically less than 10 minutes for a batch process and less than 1 minute in a continuous process intense mixing granulator. The intense mechanical mixer used by this invention, therefore, has such a high mixing energy that, once a critical binding effect is reached, or a critical amount of water has been added, it can quickly turn all fine needle or rod shaped aspartame crystalline powder particles into round powder and granular particles. Since most products, such as powder drinks and tabletop sweeteners often prefer very fine granular and powder aspartame particles, such as particles in the size range of 60–200 mesh, which are still powder-like and their processing end point is difficult to observe visually and can be easily missed by adding excess water and/or by not stopping the intense mixing in time. Besides obtaining larger than desired particle size, product made with passed processing end point also tends to have significantly reduced dissolution rate. A low power microscope is, therefore, used to assist detecting the processing end point during the product development stage. The critical water content range for the formation of the inventive product is specific to various aspartame-binder compositions and need to be determined for each product.

Adding water to homogeneously wet the aspatame-binder powder mix is time consuming at production scale. Ground ice can be used in place of water to reduce processing time and to improve wetting homogeneity. The required critical amount of ground ice (15–30% by weight of content) can be added all at once on top of the powder mix in a batch operation intense mixer right before starting mixing. The ground ice can also be added quickly through a feeder to the aspartame-binder powder mixture while mixing. The mixing action disperses the ground ice into the powder mixture, further breaks up ice particles, dissolves all ice particles to uniformly wet the powder mixture. Once all ice is melted, the wet round particle product with most particles smaller than 30 mesh size quickly forms by intense mixing, which is discharged and dried. Since there is not enough residence time for a continuous intense mechanical mixer, such as the Turbulizer of Bepex, to melt all ground ice to make round particles, a pre-wetting process is needed. The ground ice can be added to the aspartame-binder powder mix in a batch mixer to melt all ice to obtain a homogeneously wetted powder mixture which is then fed to a continuous intense mixer alone without adding any more water to make round particles which are then dried.

Very few materials are found to be able to form fine spherical powder and granular particles by intense mechanical mixing with water. For example, the above mentioned binders such as maltodextrins can not. Upon adding water to them in an intense mixer, they either remain as dusty powder or suddenly form a gummy mass. It is surprising that even fine needle crystalline aspartame can be quickly converted into spherical powder and granular particles by intense mixing with water. Aspartame containing about 0–40% binder can form spherical powder and granular particles this way. When binder content is above $\neq 35\%$, it becomes difficult to reach a clear cut end processing point to get physically stable wet round powder and granular particles instead of a gummy mass. The binder content limit for the inventive method is, therefore, 3–40% taking into consideration that about 3% or more binder is needed to produce fast-dissolving round particles. Soluble and edible materials such as maltodextrin, gum arabic, polydextrose, alcohol sugars, corn syrup solids, soluble starch, povidone and dextrin can be used as binder of this invention. Among them Maltodextrin M100 and polydextrose are the most preferred binder due to their high compatibility with aspartame, colorless aspect, and low cost. It is to be noted that the fast-dissolving feature of the inventive product is acquired from the right processing parameters described above and is essentially not affected by using any specific binder or by binder content within the content limit range. It is useful, however, to have a binder content in a range, e.g. 10–20% and a resulting particle density of 0.40–0.60 g/cc, preferably 0.45–0.55 g/cc, where the intense mixing has a reasonably broad intense mixing end-point time range for easily obtaining fast-dissolving product of this invention.

The needle or rod shaped crystalline particles of pure aspartame powder can be made into round particles without using a binder. The process requires adding more water, longer intense mixing, and drying under very gentle mixing action. The product obtained does have significantly improved flowability and water dispersibility over powder aspartame. It has, however, fragile particles which is still dusty, slow dissolving, and sticky. Adding even a small amount of binder can significantly improve these physical properties of the inventive round particle aspartame products. For example, adding a binder at $\neq 3\%$ by weight level can produce surprisingly fast dissolving effect. The round particles having such a low binder content are, however, still undesirably fragile. The lower binder content limit for the product of this invention is, therefore, around 3%. The upper binder content limit is around 40% due to increased process difficulty and product hygroscopicity.

It is surprising for a dense and round powder and granular products high in aspartame content to be fast dissolving, since aspartame is only slightly soluble having a 1% solubility. Not intending to limit the invention to any single theory, a possible mechanism is discussed here. The inventive processing method uses intense mechanical mixing to quickly form spherical particles with a critical amount of processing water. The slow dissolving character of pure aspartame granules made by the present invention method indicates that granules made using dissolved aspartame as binder are slow dissolving. Due to the large difference in solubility and dissolution rate between a binder and aspartame, the added water will dissolve the binder first in an aspartame-binder powder mix. The dissolved binder coats aspartame powder particles and binds them to form round particles while the aspartame powder particles are essentially undissolved by the inventive process. Upon putting the inventive product in water, its binder dissolves very fast to wet and release fine aspartame powder particles which, when wetted and dispersed, are fast dissolving, resulting in a fast dissolving aspartame product. When aspartame is granulated with low mechanical mixing speed methods which need more water and longer granulation time than the inventive process, there must be a significant amount of aspartame dissolved to act as binder by the granulation process, resulting in slow dissolving granular products. It is further surprising that the larger particle portion of the products of this invention also has a fast dissolution rate comparable with that of their finer particle size portion. This is surprising since it is generally true that dissolution rate decreases sharply with increasing granular particle size due to sharp reduction of the granular particle's surface area per unit mass. It appears that the powder and granular particles of this invention have an unique texture or porosity that water can rapidly penetrate and disintegrate the whole particles, not only the surface layer, into fast dissolving wetted and dispersed fine needle or rod powder particles of aspartame resulting in fast dissolution of the particles. Not wishing to be bound by any single theory, the inventor believes that the inventive particles may have the just right texture and porosity to quickly absorb water by capillary action to quickly penetrate the entire particle, and dissolve the binder coating to release and disperse the entire fine aspartame powder particles for fast dissolution. As a result all particles are as fast dissolving as water dispersed fine aspartame powder and the product of this invention has the unique feature that its rapid dissolution rate is not significantly affected by increasing its particle size.

The inventive products are particularly useful for making low-cost convenient to use table-top sweeteners. For example, they can be used directly either with a mini-spoon or by directly pouring out of a dispenser, e.g., through a small hole. They can be put in shaker bottles to be used as table-top shaker sweetener without any additional manufacturing cost and saving on individual packaging cost. A shaker container may be designed, e.g., in pen shaped dispenser, for convenient to carry and use. Their dispenser can also be designed to be a unit-dose, e.g. 1 or 2 teaspoon sugar equivalent amount of aspartame, dispenser. Due to their low hygroscopicity and round shaped particles, they have a long chemical and physical shelve life even when they are stored in open containers such as shaker bottles. Their free flowing property allows them to be packaged directly without diluting with a bulking agent at high speed to make packet products. Since they are high in aspartame content, each packet only need about 20–70 mg fill instead of 1000 mg fill like commercial products. Therefore, they can be made into such small packet products as those of salt and pepper packets. The inventive products, therefore, can be manufactured, packaged, and shipped at about 1/20th the volume of the current equivalent packet products and should result in huge reduction in manufacturing and marketing costs.

The inventive products are intended as general-purpose aspartame sweetener having significantly improved physical properties and stability over powder aspartame. They may be used in variety of products, including but not limited to food products, powder drinks, beverages, juices, alcohol beverages, carbonated beverages, vitamin, pharmaceutical, and confectionery products.

Aspartame is incompatible with many ingredients such as vitamins, drugs and flavors. Aspartame's shelf life is also reduced by hygroscopic bulking agents and reducing sugars. For dry and semi-dry products such as powder, granular, tablet and chewing gum products, sweetened by aspartame, replacing powder aspartame with an inventive product significantly improves the shelf lift of these products by a large reduction of aspartame contact with its incompatible ingredients.

This is because of a large reduction of aspartame particles contacting surface area by both increasing average particle's size over powder aspartame and by changing from needle shape particles to round shape particles.

The inventive method is also useful for making flavored aspartame sweeteners having free-flowing and fast-dissolving features. For example, mint flavor may be added in place of part of the binder to obtain an aspartame sweetener of this invention having a mint flavor. The amount of flavor is present to deliver a desirable flavor level along with a desirable sweetness level.

The following examples are provided for illustrative purposes only and are not meant to limit the scope of the invention.

EXAMPLE 1

Round Powder and Granular Aspartame Made by an Intense Mixing Food Processor

Aspartame and binder powders are weighed into a plastic container and mixed with a spoon. The powder mixture is added to a Presto Minnie Max Compact Food Processor. A small amount of crashed ice is added on top of the powder mix. Mix for about 1 minute and inspect the wetted mixture. Repeat adding crashed ice, mixing, and inspection until fine round particles are obtained. The mixture is than transferred to a non-sticky baking pan and dried in a modified food dehydrator and then sieved to obtain various particle size range samples. The following samples are prepared.

| Sample | Composition |
| --- | --- |
| A | powder aspartame, 97.0 g powder gum arabic 3.0 g |
| B | pure powder aspartame, 80 g. |
| C | powder aspartame, 40.0 g (75%) |
|   | powder Maltodextrin M100, 13.4 g (25%) |
| D | powder aspartame 51.0 g (85%) |
|   | powder gum arabic 9.0 g (15%) |
| E | powder aspartame, 81.0 g (90%) |
|   | powder Maltodextrin M100 9.0 g (10%) |

EXAMPLE 2

Round Powder and Granular Aspartame Made With an Intense Mixer

The following products are made using a model RV02 Mix Pelletizer at maximum mixing speed. Water is added, slowly through a funnel, to 2.00 kg of powder mix in the mixer while mixing at low settings of both pan rotation and mixing motor. It takes 1–2 minutes to add the water. Once water addition is completed, both the pan and the rotor mixer are turned to high speed to form spherical particles. The end point is determined by examining their particles using a low power microscope. When the end point is not reached after 2 minute intense mixing, an additional 1–2 minutes mixing with or without adding more water is tried. The end point is reached for all processes in 1–3 tryouts. The wet samples obtained are dried in a tray dryer at 55° C. in about 5 hours.

| Sample | % Composition | water (g) added |
| --- | --- | --- |
| F | powder aspartame, 85 | 561 |
|   | powder Maltodextrin M100, 15 | |
| G | powder aspartame, 85% | 560 |
|   | powder polydextrose, 15 | |
| H* | powder aspartame, 85 | 591 |
|   | powder gum arabic, 15 | |
| J* | powder aspartame, 75 | 420 |
|   | powder Maltodextrin M100, 25 | |

*made by passing the processing end-point resulting in large portion of oversized particles

EXAMPLE 3

Dissolution Rate and Bulk Density

The complete dissolution time of about 100 mg of one of the samples of the above examples in 200 ml room temperature water under gentle stirring is determined. The bulk density of some of the samples is also determined. Results are given below.

| Product | Particle size range (mesh) | Bulk density (g/cc) | Dissolution time (second) |
| --- | --- | --- | --- |
| A | −60 | 0.36 | 27 |
|   | 60–40 |   | 80 |
|   | 40–20 |   | 215 |
| B | −140 |   | 100 |
|   | 140–40 |   | 205 |
|   | 40–25 |   | 450 |
| C | −140 |   | 30 |
|   | 140–40 |   | 40 |
|   | 40–25 |   | 57 |
| D | −40 |   | 28 |
|   | 20–40 |   | 75 |
| E | −140 |   | 30 |
|   | 140–40 |   | 35 |
|   | 40–25 |   | 45 |
| F | 140–40 | 0.51 | 29 |
|   | 40–20 | 0.56 | 38 |
| G | −140 | 0.52 | 30 |
|   | 140–40 | 0.52 | 35 |
|   | 40–20 | 0.55 | 47 |
| H | −140 |   | 35 |
|   | 140–40 |   | 130 |
| J | −140 |   | 85 |
|   | 140–40 |   | 180 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

Various features of the invention are set forth in the following claims.

What is claimed is:

1. A method of producing a fast-dissolving dense aspartame product in powder and/or granular form having round particles comprising the steps of:
   a. mixing powdered aspartame and powdered binder selected from the group consisting of maltodextrin, polydextrose, gum arabic, soluble starch, corn syrup solid, alcohol sugar, dextrose, dextrin, and povidone, said aspartame present in the weight percentage range of 60–97% on a dry weight basis, to form a mixture;
   b. mixing said mixture intensely in a mechanical mixer with water until the formation of round powder and granular particles, generally, smaller than 30 mesh size;
   c. stopping said mixing and discharging said mixture at once;
   d. drying and then sieving the wet product obtained.

2. The methods of claim 1 wherein said mixer is selected from the group consisting of mix pelletizers, mechanical mixers equipped with choppers, and continuous intense mixing granulators.

3. A method of producing a fast dissolving dense aspartame product in powder and/or granular form having round particles comprising the steps of:
   a. mixing powder aspartame and powder binder selected from the group consisting of maltodextrin, polydextrose, gum arabic, soluble starch, corn syrup solid, alcohol sugar, dextrose, dextrin, and povidone, said aspartame present in the weight percentage range of 60–97% on a dry weight basis, to form a mixture;
   b. mixing said mixture with ground ice to disperse ice particles in said mixture, break up ice particles, and melt all ice particles to obtain a homogeneously wetted powder;
   c. mixing said wetted powder intensely in a mixer to form spherical particles generally smaller than 30 mesh size;
   d. stopping said mixing and discharging said mixture at once;
   e. drying and then sieving the wet product obtained.

4. The methods of claim 3 wherein said mixer is selected from the group consisting of mix pelletizers, mechanical mixers equipped with choppers, and continuous intense mixing granulators.

5. An aspartame product in powder or granular form having generally round particles having a narrow untapped bulk density in the range from about 0.40 g/cc to about 0.62 g/cc comprising a mixture of aspartame and an edible water-soluble binder, said aspartame being present in said mixture in an amount from about 60% to about 97% on a dry weight basis, said aspartame product having a faster dissolution rate in water than pure aspartame.

6. The aspartame product of claim 5 wherein said aspartame is present in said mixture in an amount from about 80% to about 90% and said binder is present in said mixture from about 10% to about 20% on a dry weight basis.

7. The product of claim 5 wherein said edible water soluble binder is selected from the group consisting of maltodextrin, gum arabic, polydextrose, corn syrup solid, dextrin, soluble starch, povidone and alcohol sugar.

8. The aspartame product of claim 5 further including a flavoring agent.

9. The aspartame product of claim 5 wherein said narrow untapped density is in the range of about 0.45 g/cc to about 0.55 g/cc.

* * * * *